United States Patent
Mansour

(10) Patent No.: US 7,532,909 B2
(45) Date of Patent: May 12, 2009

(54) SYSTEM AND METHOD FOR PROVIDING DEDICATED PAGING CHANNELS FOR WALKIE-TALKIE SERVICES

(75) Inventor: Nagi A. Mansour, Arlington, VA (US)

(73) Assignee: Nextel Communications Inc., Reston, VA (US)

( * ) Notice: Subject to any disclaimer, the term of this patent is extended or adjusted under 35 U.S.C. 154(b) by 101 days.

(21) Appl. No.: 10/852,212

(22) Filed: May 25, 2004

(65) Prior Publication Data

US 2005/0085253 A1 Apr. 21, 2005

Related U.S. Application Data

(60) Provisional application No. 60/511,118, filed on Oct. 15, 2003.

(51) Int. Cl.
*H04M 1/00* (2006.01)

(52) U.S. Cl. .......... 455/553.1; 455/518; 455/519; 455/520; 455/521; 455/552.1

(58) Field of Classification Search .......... 455/515, 455/516, 517, 518–521, 552.1–553.1
See application file for complete search history.

(56) References Cited

U.S. PATENT DOCUMENTS 5,930,706 A * 7/1999 Raith .......... 455/422.1

| | | | |
|---|---|---|---|
| 6,532,224 B1 * | 3/2003 | Dailey | 370/337 |
| 2002/0191583 A1 * | 12/2002 | Harris et al. | 370/345 |
| 2003/0148785 A1 | 8/2003 | Mangal et al. | |
| 2005/0036464 A1 * | 2/2005 | Rajkotia et al. | 370/336 |

OTHER PUBLICATIONS

International Search Report, mailed May 29, 2007, directed to counterpart International Patent Application No. PCT/US04/33688; 2 pages.

International Preliminary Report on Patentability and Written Opinion, mailed Jul. 19, 2007, directed to counterpart International Patent Application No. PCT/US04/33688; 11 pages.

* cited by examiner

Primary Examiner—Raymond S Dean

(57) ABSTRACT

A system and method for reducing set-up time for walkie-talkie calls. One or more mobile units are assigned to a first paging channel and a second paging channel. A first and second slot cycle may be determined using a first and second slot cycle index, respectively. The second paging channel slot cycle is determined using a negative slot cycle index. A mobile unit can then be configured to monitor the first paging channel during the first slot cycle. Similarly, the mobile unit may also be configured to monitor the second paging channel during the second slot cycle. The first paging channel may be used to provide the mobile unit with notification of a cellular call and the second paging channel may be used to provide notification of a walkie-talkie call. The second paging channel is checked more frequently than the first paging channel.

13 Claims, 4 Drawing Sheets

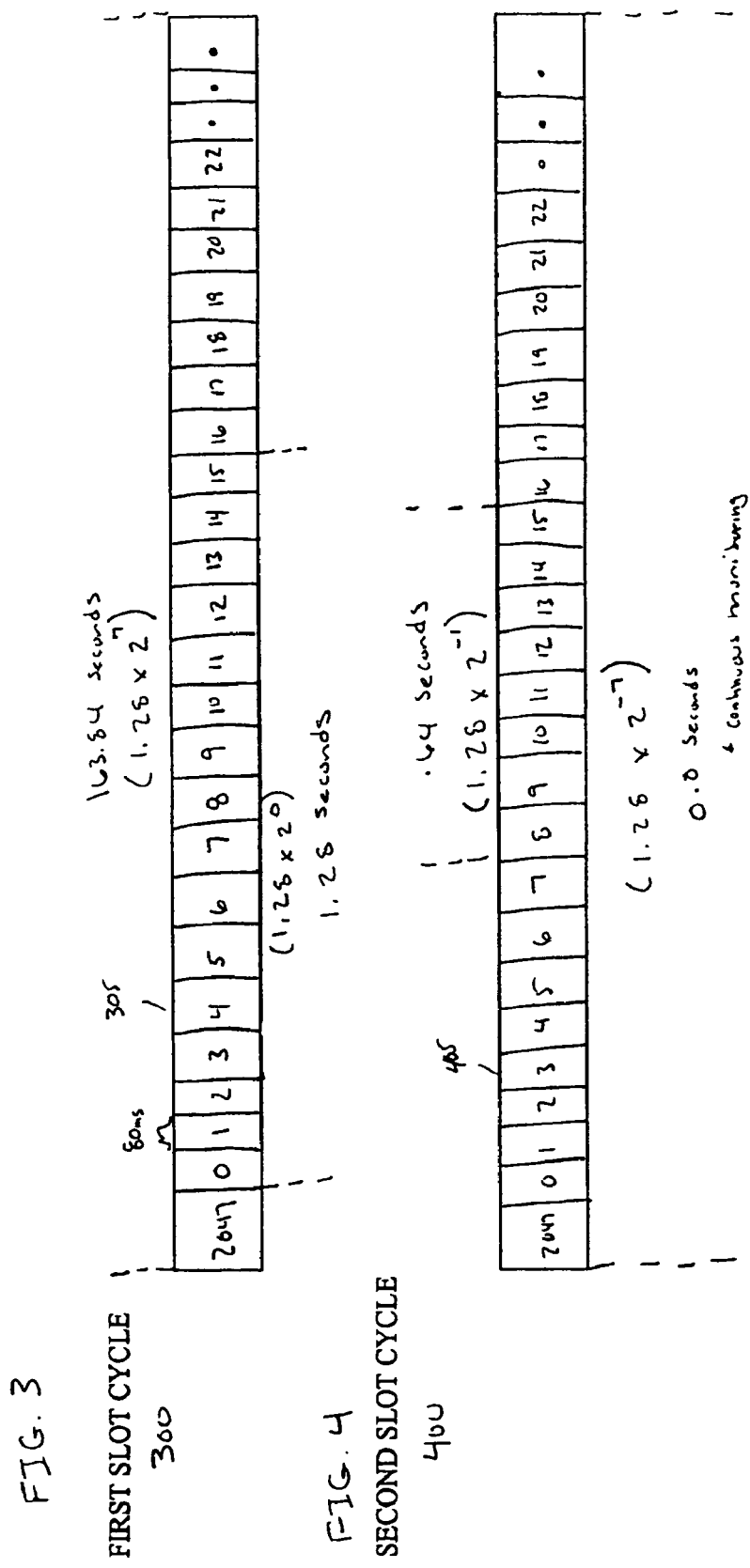

SYSTEM AND METHOD FOR PROVIDING DEDICATED PAGING CHANNELS FOR WALKIE-TALKIE SERVICES

CROSS-REFERENCE TO RELATED APPLICATIONS

This application claims priority to U.S. Provisional Application No. 60/511,118, filed on Oct. 15, 2003, by Nagi A. Mansour, and incorporated herein by reference in its entirety.

BACKGROUND OF THE INVENTION

1. Field of Invention

This invention relates to the field of telecommunications. More specifically, this invention relates to dedicated paging channels that may be used to provide walkie-talkie calls in a telecommunications system.

2. Background

Society is more mobile today than it has ever been before. In response to our increased mobility, technology has had to respond to our ever increasing need to communicate with business colleagues, family members and friends while we are on the move. Thus, mobile communications systems, including wireless telephones and other wireless communications devices have evolved from novel accessories to almost absolute necessities.

An exemplary mobile communications system 100 is depicted in FIG. 1. During typical operation of such a system, the mobile units 125 are communicating with a base station 120 and remain in an idle mode when not engaged in or checking for an active call. Notifications of incoming calls and other traffic are sent from the base station controller 115 to the base station 120 then to the target mobile unit 125 over a paging channel. Thus, one of the most important things mobile unit 125 does while in idle mode is awaken, turn on its receiver and check to see if it has an incoming call or other information from the base station 120 to which it must respond.

The receiver consumes quite a lot of power. Therefore, in an effort to conserve battery life, mobile unit 125 will supply power to its receiver only during active call states or specified monitoring periods referred to as slot cycles. Slot cycles are determined by a slot cycle index associated with mobile unit 125. These slot cycles are initially determined when mobile unit 125 first registers with base station 120. Base station controller 115 and base station 120 determine the paging channel which the mobile unit's receiver will monitor for incoming notifications.

In cdma2000 based systems, slot cycles are typically set at intervals of either 2.56 seconds or 5.12 seconds. This information is passed from the base station to mobiles in the same geographical area. When a call is initiated, the communication system 100 generates the sound of a ringer back to the caller and sends a call notification to the mobile unit 125 of the call recipient. The mobile unit 125 monitors the paging channel for call notifications only during the assigned 80 ms paging channel slots. When the mobile unit 125 receives a call notification, it sends an acknowledgment to the base station. Once the mobile unit 125 acknowledges the notification, the call will be set-up. The call set-up time is determined from the time the caller initiated a call to the time the call recipient answered. This approach is adequate for normal cellular calls and saves battery life since the receiver is not in constant use, but the approach has a disadvantage of longer set-up times.

As explained above, the typical delay for notifying mobile unit 125 of a call is 2.56 seconds or 5.12 seconds. This is without considering the added delay that has incurred due the network side of the operation. Under normal conditions, the 2.56 second or 5.12 second delay is acceptable since the cellular user does not expect immediate response. Currently, however, there are dual service mobile units that are capable of receiving both cellular type calls and walkie-talkie calls. Walkie-talkie calls are of the type where only one person is able to speak at a time. In other words, communications are exchanged in a half-duplex, as opposed to full-duplex mode. Heretofore, one paging channel has been used to provide notification of both regular cellular calls and walkie-talkie calls. Consequently, both types of calls are subject to the same 2.56 second or 5.12 second delay.

Cellular callers do not expect instant connection type of a service, so a few seconds of call set-up time is acceptable. However, it has been found that such delay is unacceptable for walkie-talkie calls. When placing walkie-talkie calls, callers want to connect instantly to those being called. Therefore, what is needed is a technique for providing notification of cellular calls and walkie-talkie calls which reduces the amount of setup time associated with making and receiving walkie-talkie calls.

BRIEF SUMMARY OF THE INVENTION

In accordance with an embodiment of the present invention, a system and method are provided for reducing set-up time for walkie-talkie calls. In an embodiment, one or more mobile units are assigned to a first paging channel. The one or more mobile units are also assigned to a second paging channel. In yet another embodiment, a first paging channel having a slot cycle that may be determined using a first slot cycle index and a second paging channel having a slot cycle that may be determined using a second slot cycle index are provided. In an embodiment, a mobile unit profile is associated with each mobile unit. The mobile unit profile may be used to provide various information about the mobile unit. For example, the mobile unit profile may include information about the number of times the mobile unit is used for walkie-talkie calls. A mobile unit can then be configured to monitor the first paging channel during the first slot cycle or the second paging channel during the second slot cycle according to its mobile unit profile.

In yet another embodiment, the first paging channel may be used to provide the mobile unit with notification of a cellular call and the second paging channel may be used to provide notification of a walkie-talkie call. In this way, the second paging channel may be dedicated for providing walkie-talkie services.

In an embodiment of the present invention, the second paging channel slot cycle is determined using a negative slot cycle index.

Further features of the present invention, as well as the structure and operation of various embodiments of the present invention are described in detail below with reference to the accompanying drawings.

BRIEF DESCRIPTION OF THE DRAWINGS

The accompanying drawings, which are incorporated herein and form part of the specification, illustrate the present invention and together with the description, further serve to explain the principles of the invention and to enable a person skilled in the pertinent art to make and use the invention. In the drawings, like reference numbers indicate identical or functionally similar elements. Additionally, the left-most dig

FIG. 3 illustrates a first slot cycle in accordance with an embodiment of the present invention.

FIG. 4 illustrates a second slot cycle in accordance with an embodiment of the present invention.

DETAILED DESCRIPTION OF THE INVENTION

Exemplary System

The present invention will be described as it is applied to a communications system using the Code Division Multiple Access (CDMA) communications standard. However, in alternative embodiments, the present invention may also be used in communications systems using standards such as Time Division Multiple Access (TDMA), TD-CDMA, Global System for Mobile Communications, and others.

Figure 1:
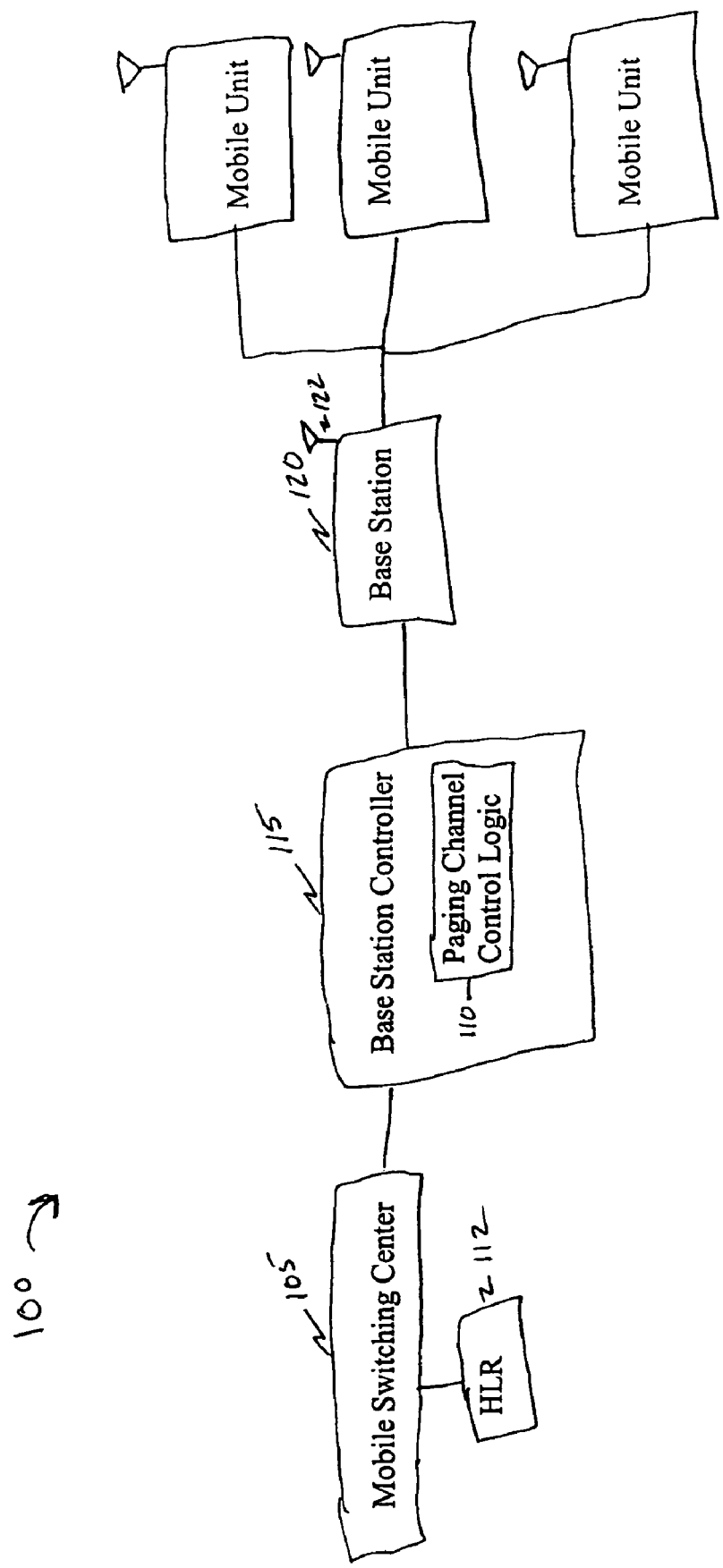
- FIG. 1 is a high level block diagram of a communications system in accordance with an embodiment of the present invention.

Referring again to FIG. 1, mobile communications system 100 is shown according to an embodiment of the present invention. The mobile communications system 100 is comprised of mobile switching center 105. Mobile switching center 105 controls the operation of communications system 100. In this regard, mobile switching center 105 is used to manage calls within the system 100, maintain location information for wireless devices within the system, and perform many other tasks as would be understood by a person skilled in the relevant art.

Mobile communications system 100 is further comprised of base station controller 15 and base station 120. Base station controller 15 is responsible for managing the radio frequencies available for use within mobile communications system 100. Base station 120 has an antenna 122 and is used to transmit signals within the coverage area of the mobile communications system 100. Although mobile communications system 100 has been described with reference to a single base station controller 115 and a single base station 120, such description is for example only and not limitation. One skilled in the relevant art will understand that mobile communications system 100 can be configured in multiple ways without departing from the spirit and scope of the present invention.

In and embodiment, mobile communications system 100 is further comprised of paging channel control logic 110. In an embodiment, paging channel control logic 110 resides in base station controller 15. However, one skilled in the relevant art will recognize that paging channel control logic 110 can appear in other components of the system, such as for example base station 120. Paging channel control logic 110 is configured to manage the use of paging channels and slot cycles within mobile communications system 100. The configuration of paging channel control logic 110 will be apparent to persons skilled in the relevant art based on the teachings provided herein.

In an embodiment, mobile communications system 100 is further comprised of a home location register (HLR) 112. In an embodiment, home location register 112 is used to store a mobile unit profile for each mobile communications device operating within the system. The mobile unit profile may provide various information about the functionality and use of the mobile unit. For example, in an embodiment, the mobile unit profile may include information about how often the mobile unit is used for walkie-talkie calls.

In an embodiment, mobile communications system 100 is further comprised of one or more mobile units 125. Mobile units 125 may be cellular telephones, combination cellular telephones and two-way radios, and other mobile devices capable of providing full duplex and half duplex communications. In an embodiment, one or more of mobile units 125 are configured to provide both cellular calls and walkie-talkie calls.

Figure 2:
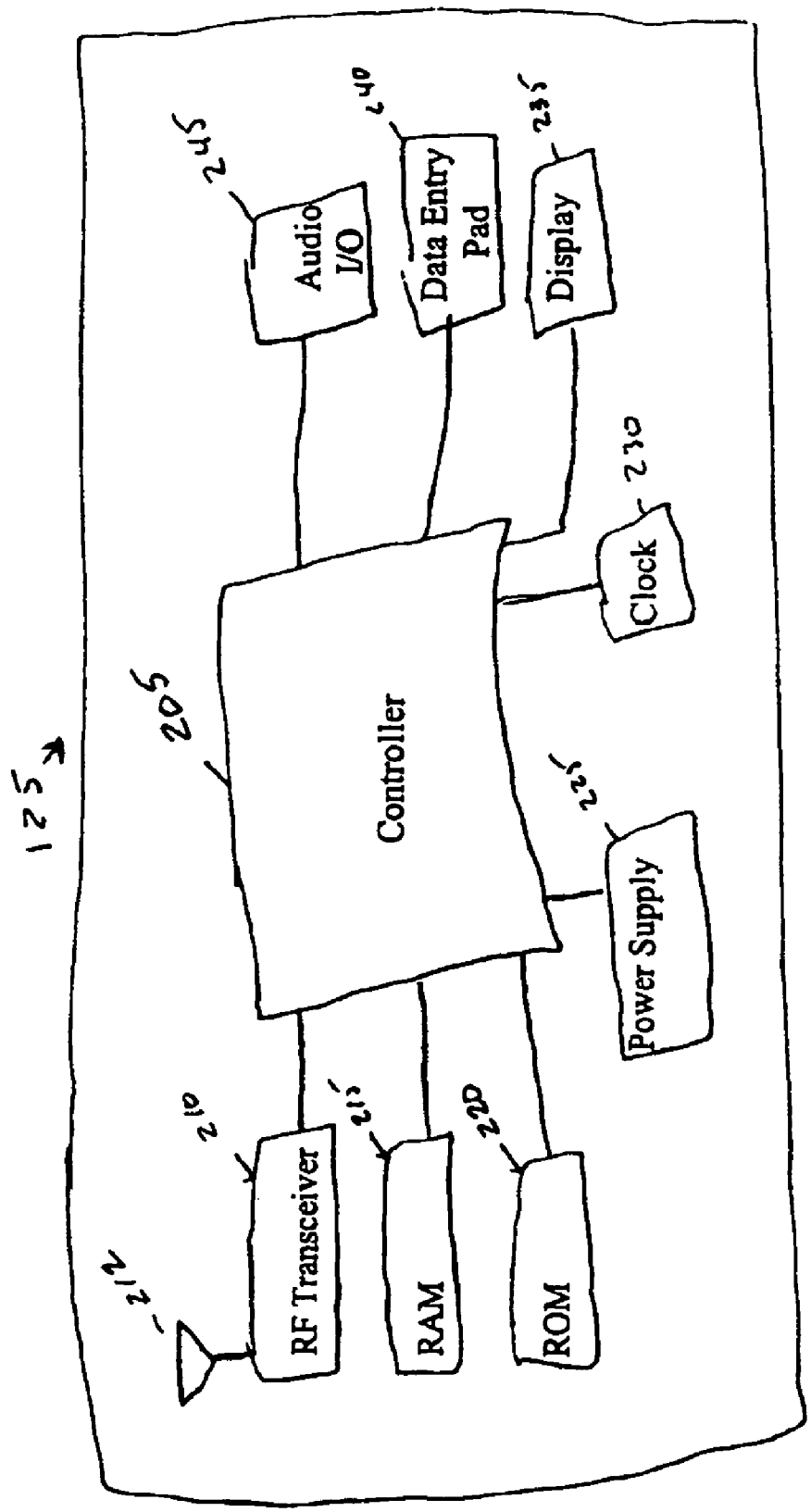
FIG. 2 is a block diagram of a mobile unit in accordance with an embodiment of the present invention.

Referring to FIG. 2, a mobile unit 125 is shown in accordance with an embodiment of the present invention. Mobile unit 125 includes controller 205. Controller 205 is used to control the functions of mobile unit 125, including for example, signal processing, managing input and output, and information display functions. Mobile unit 125 is further comprised with one or more RAM chips 215 and ROM chips 220. RAM chips 215 provide programmable memory, as well as data storage while ROM chips 220 store information such as the mobile unit's electronic serial number. Mobile unit 125 is also provided with a clock circuit 230. Clock circuit 230 provides timing functionality within mobile control unit 125. Such functionality can include for example, call timers and current time features. Clock timing can also be extracted using a GPS receiver. Over the air communications is enabled through RF transceiver 210 and antenna 212. An audio circuit 245 is also provided within mobile unit 125. Audio unit 245 is used to provide audio output to mobile unit 125. In an embodiment, mobile unit 125 is further comprised of a data entry pad 240. The data entry pad 240 is used to allow data to be entered into mobile unit 125 and is often provided in the form of a keypad. In an embodiment, mobile unit 125 is further provided with display 235. Display 235 is used to provide a series of status indicators and other information related to calls being sent or received by mobile unit 125. Finally, in an embodiment, the mobile unit 125 is provided with power supply 225. Power supply 225 supplies power to RF transceiver 210 as well as other components of mobile unit 125.

As briefly discussed above, paging channels are used to send notifications or pages to mobile units operating within wireless communications systems. These notifications alert the mobile units when they have an incoming call. An exemplary implementation of a paging channel will now be described with reference to FIG. 3.

Referring to FIG. 3, a first slot cycle 300 is shown in accordance with an embodiment of the present invention. First slot cycle 300 is comprised of a plurality of slots 305. Each of the slots 305 is transmitted during a specified time period. This time period is typically determined by a base station 120 or base station controller 115, using a slot cycle index. Heretofore, slot cycle indices have been positive integers ranging from 0 to 7. For any given index, the value of the first slot cycle 300 would be determined by the calculation of 1.28 multiplied by $2^N$. In this regard the minimum time period of the first slot cycle 300 would be equal to 1.28 seconds, where N=0. Likewise, the maximum time period of the first slot cycle 300 would be equal to 163.84 seconds, where N=7. For cdma2000, in North America, operators usually choose a slot cycle index of either 1 or 2. In this way, the minimum time period for first slot cycle 300 would be equal to 2.56 seconds or 5.12 seconds respectively. These time periods add to the overall set-up times associated with placing a call.

The technique of using a single paging channel and a slot cycle of 2.56 or 5.12 seconds helps to conserve battery life, but has the disadvantage of longer setup times for call connections. Further, since notifications of walkie-talkie calls are sent over the same paging channel used to send notifications of cellular calls, walkie-talkie call notifications will be subject to the same longer setup times. To avoid this problem, the present invention provides for a dedicated second paging channel for use in providing walkie-talkie call notifications.

Referring to FIG. 4, in an embodiment of the present invention, a second slot cycle 400 is used for monitoring walkie-talkie call notifications. In an embodiment of the present invention, these walkie-talkie call notifications may be sent over the second paging channel. In this way, the second paging channel serves as a dedicated walkie-talkie paging channel. As with determining the first slot cycle 300, the second slot cycle 400 is also determined by the equation $(1.28 \times 2^N)$. However, in an embodiment of the present invention, N is an integer having a value less than one. In yet another embodiment, the value of N is set equal to negative one (−1). In this way, the second slot cycle 400 would be equal to 0.64 seconds. Although this technique causes faster battery drain, it has the advantage of enabling shorter call-set up times. Thus, callers placing walkie-talkie calls will not have to endure long periods of silence while they wait for the call to connect.

Exemplary Method

Figure 5:
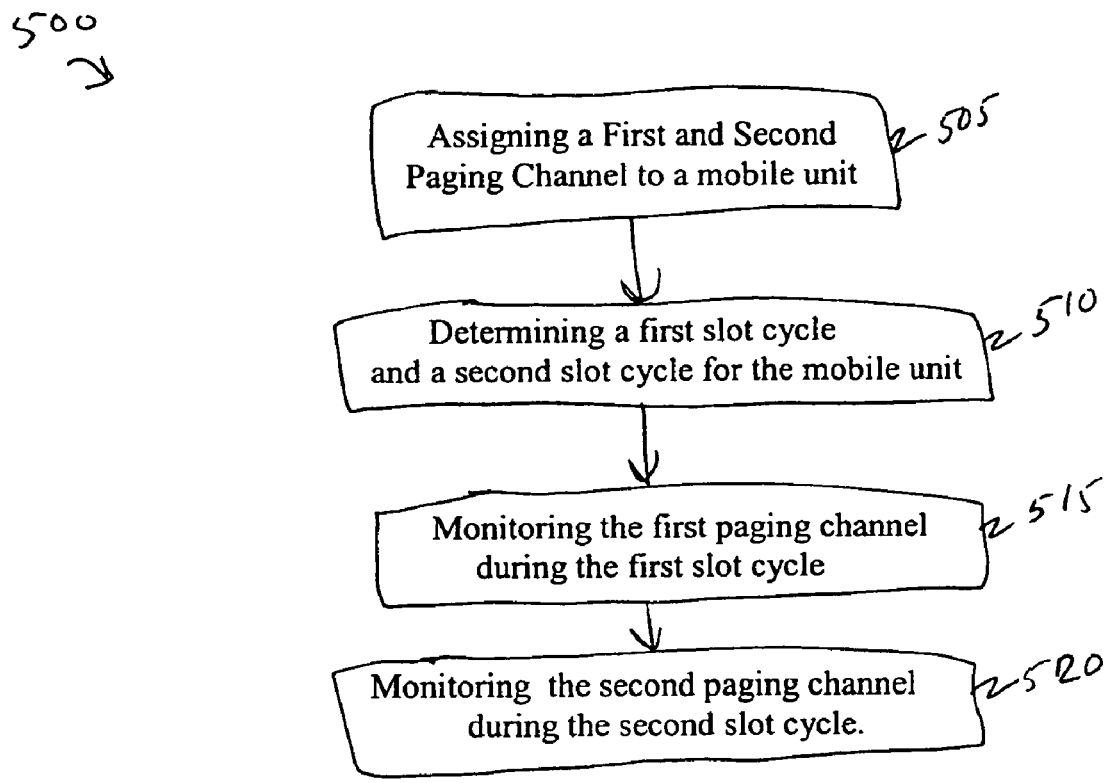
FIG. 5 is a flowchart diagram of a method for providing dedicated paging channels for walkie-talkie call services in accordance with an embodiment of the present invention.

A method for dedicating a paging channel for walkie-talkie services in a mobile communications system will now be described with continued reference to the structures described in FIGS. 1-4 and the steps shown in FIG. 5.

In a first step 505, a first paging channel is assigned to each mobile unit 125. In an embodiment, a second paging channel is also assigned to each mobile unit 125 that is capable of providing both cellular services and walkie-talkie services. In an embodiment, the first paging channel and the second paging channel are each assigned to a mobile unit 125 when the unit is first powered on. These assignments may be changed as the mobile unit moves throughout the network or to optimize system performance. In an embodiment, the second paging channel is assigned to mobile unit 125 when a walkie-talkie activation button on the mobile unit 125 is activated. In an embodiment, base station controller 115 is provided with paging channel control logic 110 and may be used to assign the first paging channel and the second paging channel.

Next in a step 510, a first slot cycle is determined for the first paging channel and a second slot cycle is determined for the second paging channel. In an embodiment, the first slot cycle is determined using a first slot cycle index (N), wherein the first slot cycle equals $1.28 \times 2^N$. In an embodiment, N is a positive integer having a value between 0 and 7. Therefore, the time period for the first slot cycle can range between 1.28 seconds and 163.84 seconds. Similarly, in an embodiment, the second slot cycle is determined using a second slot cycle index (N') and the equation $(1.28 \times 2^{N'})$. In an embodiment, N' may be an integer having a value less than or equal to one. In yet another embodiment, N' may be a negative integer. In yet another embodiment, N' has a value of negative one. In an embodiment, base station controller 115 or the base station 122 may be used to determine the first and second slot cycles. In an embodiment, each mobile unit 125 may be used to determine the first and second slot cycles. By using a negative second slot cycle indices, the present invention is able to achieve faster set-up times than those obtained by use of the positive first slot cycle indices.

Next in a step 515, controller 205 directs power from power supply 225 to receiver 210 during the first slot cycle if the mobile unit profile shows the mobile unit to be mainly used for cellular type calls. Receiver 210 is then used to monitor the first paging channel for a predetermined number of slots 303 for notification of a cellular call or other information sent by base station controller 115. If a notification is present, controller 205 will respond to the notification or information as appropriate. In the event no notification or information is being transmitted for mobile unit 125, then the unit will return to idle mode until the next first slot cycle occurs. By cycling power to the receiver, mobile unit 125 is able to conserve battery power between active call states.

In a step 520, controller 205 directs power from power supply 225 to receiver 210 during the second slot cycle. Receiver 210 is then used to monitor the second paging channel for a predetermined number of slots 403 for notification of a walkie-talkie call. In an embodiment, step 520 may be performed after a walkie-talkie call is initiated on the mobile unit 125. In yet another embodiment, the mobile unit profile associated with the mobile unit 125 indicates that walkie-talkie services are used often, thus step 520 may be performed before a walkie-talkie call is initiated. In this way, walkie-talkie call set-up time can be reduced because the mobile unit 125 will already be monitoring for a walkie-talkie call notification. In an embodiment, if 50% of a mobile unit's use is for placing and receiving walkie-talkie calls, then the mobile unit 125 may be set up to monitor the second paging channel automatically. If a notification is present on the second paging channel, controller 205 will respond to the notification and request that a walkie-talkie call connection be set-up. In the event no notification is being transmitted for the mobile unit 125, then the unit will return to idle mode until the next second slot cycle occurs. In an embodiment, the mobile unit 125 is able to initiate and respond to walkie-talkie calls more quickly by monitoring the dedicated paging channel more often. This technique may ensure that callers connect instantly when placing walkie-talkie calls to one another.

Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should only be defined in accordance with the following claims and their equivalents.

What is claimed is:

1. A method for providing mobile communication walkie-talkie services in a communication system including a base station controller and at least one mobile unit, comprising:

determining a first slot cycle using a first slot cycle index, determining a second slot cycle using a second slot cycle index, monitoring a first paging channel, over which communications are sent, during the first slot cycle, whereby the first paging channel is enabled for providing cellular call services, monitoring a second paging channel, over which communications are sent, during the second slot cycle, whereby the second paging channel is reserved for and dedicated to providing one-to-one walkie-talkie services, using mobile unit usage data to determine when to begin the monitoring of the second paging channel wherein the mobile unit usage data is stored in a profile associated with a mobile unit and indicates how often the mobile unit uses walkie-talkie services, automatically setting up the monitoring of the second paging channel before a walkie-talkie call is initiated on the mobile unit if the mobile unit profile indicates a usage of walkie-talkie services exceeding a threshold level, and not setting up the monitoring of the second paging channel until after a walkie-talkie call is initiated on the mobile unit if the mobile unit profile indicates a usage of walkie-talkie services not exceeding a threshold level.

2. The method of claim 1, wherein the step of determining a second slot cycle comprises determining the second slot cycle using a slot cycle index having a value less than two.

3. The method of claim 1, wherein the step of determining a second slot cycle comprises determining the second slot cycle using a negative slot cycle index.

4. The method of claim 1, wherein the step of determining a second slot cycle comprises determining the second slot cycle using a slot cycle index having a value of negative one.

5. A method for providing dedicated paging channels for walkie-talkie paging services in a communications system including a base station controller and at least one mobile unit, the method comprising the steps of:
assigning one or more mobile units to a first paging channel over which communications are sent,
assigning the one or more mobile units to a second paging channel over which communications are sent,
determining a first slot cycle for each of the one or more mobile units,
determining a second slot cycle for each of the one or more mobile units,
using the first paging channel to notify each of the one or more mobile units of a cellular call, and
using the second paging channel to notify each of the one or more mobile units of a walkie-talkie call,
wherein the second paging channel is reserved for and dedicated to providing one-to-one walkie-talkie services, and
wherein the one or more mobile units are not assigned to the second paging channel until after a walkie-talkie call is initiated on the respective mobile units.

6. The method of claim 5, wherein the determining a second slot cycle step uses a second slot cycle index to determine the second slot cycle.

7. The method of claim 6, further comprising the step of setting the second slot cycle index to a value less than two.

8. The method of claim 6, further comprising the step of setting the second slot cycle index to a value of negative one.

9. A mobile communications device comprising:
a receiver for receiving a first slot cycle index and a second slot cycle index,
a controller for determining a first slot cycle using the first slot cycle index and a second slot cycle using the second slot cycle index, wherein the first slot cycle is used to monitor a first paging channel, over which communications are sent, used for providing cellular call services, and the second slot cycle is used to monitor a second paging channel, over which communications are sent, reserved for and dedicated to providing one-to-one walkie-talkie services, and
a power supply that supplies power to the receiver during the first slot cycle and the second slot cycle,
wherein the second paging channel is not monitored until after a walkie-talkie call is initiated on the mobile communications device.

10. A mobile communications system comprising:
a base station controller,
a base station configured to assign one or more mobile units to a first paging channel, over which communications are sent, used for providing cellular call services, and a second paging channel, over which communications are sent, reserved for and dedicated to providing one-to-one walkie-talkie services, and
a receiver configured to receive a first slot cycle for each of the one or more mobile units and a second slot cycle for each of the one or more mobile units,
wherein the one or more mobile units are not assigned to the second paging channel until after a walkie-talkie call is initiated on the respective mobile units.

11. The mobile communications system of claim 10, wherein the first paging channel enables notification of a cellular call to each of the one or more mobile units and the second paging channel enables notification of a walkie-talkie call to each of the one or more mobile units.

12. The mobile communications system of claim 10, further comprising a mobile unit profile for each of the one or more mobile units.

13. The method of claim 1, wherein the threshold level represents a ratio of walkie-talkie services to cellular call services.

* * * * *